(12) United States Patent
Marasigan

(10) Patent No.: US 11,221,164 B2
(45) Date of Patent: Jan. 11, 2022

(54) HEAT EXCHANGE SYSTEM AND REFRIGERANT CYCLE INCLUDING HEAT EXCHANGE SYSTEM

(71) Applicants: DENSO AUTOMOTIVE Deutschland GmbH, Eching (DE); DENSO CORPORATION, Kariya (JP)

(72) Inventor: Ariel Marasigan, Eching (DE)

(73) Assignees: DENSO AUTOMOTIVE DEUTSCHLAND GMBH, Eching (DE); DENSO CORPORATION, Kariya (JP)

(*) Notice: Subject to any disclaimer, the term of this patent is extended or adjusted under 35 U.S.C. 154(b) by 153 days.

(21) Appl. No.: 16/589,217

(22) Filed: Oct. 1, 2019

(65) Prior Publication Data
US 2020/0109884 A1    Apr. 9, 2020

(30) Foreign Application Priority Data
Oct. 8, 2018 (DE) .......................... 102018124755.9

(51) Int. Cl.
*F25B 41/31* (2021.01)
*B60H 1/00* (2006.01)
*F25B 41/20* (2021.01)

(52) U.S. Cl.
CPC ......... *F25B 41/31* (2021.01); *B60H 1/00485* (2013.01); *F25B 41/20* (2021.01); *B60H 2001/00171* (2013.01)

(58) Field of Classification Search
CPC ........ F25B 41/31; F25B 41/33; F25B 41/335; F25B 41/32; F25B 2600/2513; G05D 23/01; G05D 23/015; G05D 23/02; G05D 23/021; G05D 23/022; G05D 23/024; G05D 23/025; F16K 11/04; Y10T 137/87981;
(Continued)

(56) References Cited

U.S. PATENT DOCUMENTS 3,252,294 A * 5/1966 Heidorn ................. F25B 41/31
                                                                62/207
3,352,125 A 11/1967 Beatenbough et al.
(Continued)

FOREIGN PATENT DOCUMENTS

DE    112013002481 T5    1/2015
DE    102015205933 A1    10/2016
(Continued)

*Primary Examiner* — Marc E Norman
(74) *Attorney, Agent, or Firm* — Harness, Dickey & Pierce, P.L.C.

(57) ABSTRACT

A heat exchange system includes a dual expansion valve for a refrigerant cycle of a vehicle that includes a first inlet and a first outlet, a first flow restriction mechanism including a movable first valve element, by which a first refrigerant stream flowing through a first passage from the first inlet to the first outlet can be controlled, a second inlet and a second outlet, a second flow restriction mechanism including a movable second valve element, by which a second refrigerant stream flowing through a second passage from the second inlet to the second outlet can be controlled, a control member for jointly moving the first valve member and the second valve member, a sensing element for sensing a temperature, and a valve driving member that is configured to drive the control member according to the sensed temperature.

15 Claims, 4 Drawing Sheets

(58) Field of Classification Search
CPC ............... B60H 1/00278; B60H 1/004; B60H 1/00485
USPC .................................................. 137/614.11
See application file for complete search history.

(56) References Cited

U.S. PATENT DOCUMENTS

| | | | |
|---|---|---|---|
| 4,024,909 A * | 5/1977 | Hofmann, Jr. ....... | G05D 23/022 165/297 |
| 2012/0036884 A1 | 2/2012 | Ahn et al. | |
| 2012/0125032 A1 | 5/2012 | Graaf et al. | |
| 2015/0135749 A1 | 5/2015 | Ohta | |
| 2016/0318370 A1* | 11/2016 | Rawlinson ............ | B60L 3/0061 |
| 2017/0358833 A1 | 12/2017 | Jalilevand et al. | |
| 2018/0172328 A1 | 6/2018 | Feldkeller et al. | |

FOREIGN PATENT DOCUMENTS

| | | |
|---|---|---|
| JP | 2002-352866 A | 12/2002 |
| JP | 2012-111486 A | 6/2012 |

* cited by examiner

COMPARATIVE EXAMPLE

HEAT EXCHANGE SYSTEM AND REFRIGERANT CYCLE INCLUDING HEAT EXCHANGE SYSTEM

CROSS REFERENCE

The present application is based on German Patent Application No. 102018124755.9 filed on Oct. 8, 2018, the disclosure of which is incorporated herein by reference.

TECHNICAL FIELD

The present disclosure relates to a heat exchange system and a refrigerant cycle including a heat exchange system.

BACKGROUND

Refrigerant cycles as part of cooling/heating systems may be used in motor vehicles with an electric drive (for example, with a fuel cell) or hybrid drive. Such refrigerant cycles typically include a heat exchange system for exchanging heat between various components.

SUMMARY

In one exemplary aspect of the present disclosure, a heat exchange system for a vehicle includes a first heat exchanger arranged to provide heat exchange between a refrigerant circuit and a coolant circuit, and a dual expansion valve. The dual expansion valve includes a first inlet and a first outlet, a first flow restriction mechanism including a movable first valve element, by which a first refrigerant stream flowing through a first passage from the first inlet to the first outlet can be controlled, a second inlet and a second outlet, a second flow restriction mechanism including a movable second valve element, by which a second refrigerant stream flowing through a second passage from the second inlet to the second outlet can be controlled, a control member for jointly moving the first valve member and the second valve member, a sensing element for sensing a temperature, and a valve driving member that is configured to drive the control member according to the sensed temperature. The refrigerant circuit is configured such that the first refrigerant stream enters upstream into the first heat exchanger and the second refrigerant stream exits downstream of the first heat exchanger, and the dual expansion valve is configured for thermal management of a heat source within the coolant circuit that is exchanging heat with the refrigerant circuit.

The details of the present disclosure will become more readily apparent from the following description of advantageous embodiments thereof with reference to the accompanying drawings. The same reference numerals refer generally to identical or similar parts or to parts providing the same or similar functionality.

DETAILED DESCRIPTION

Figure 1:
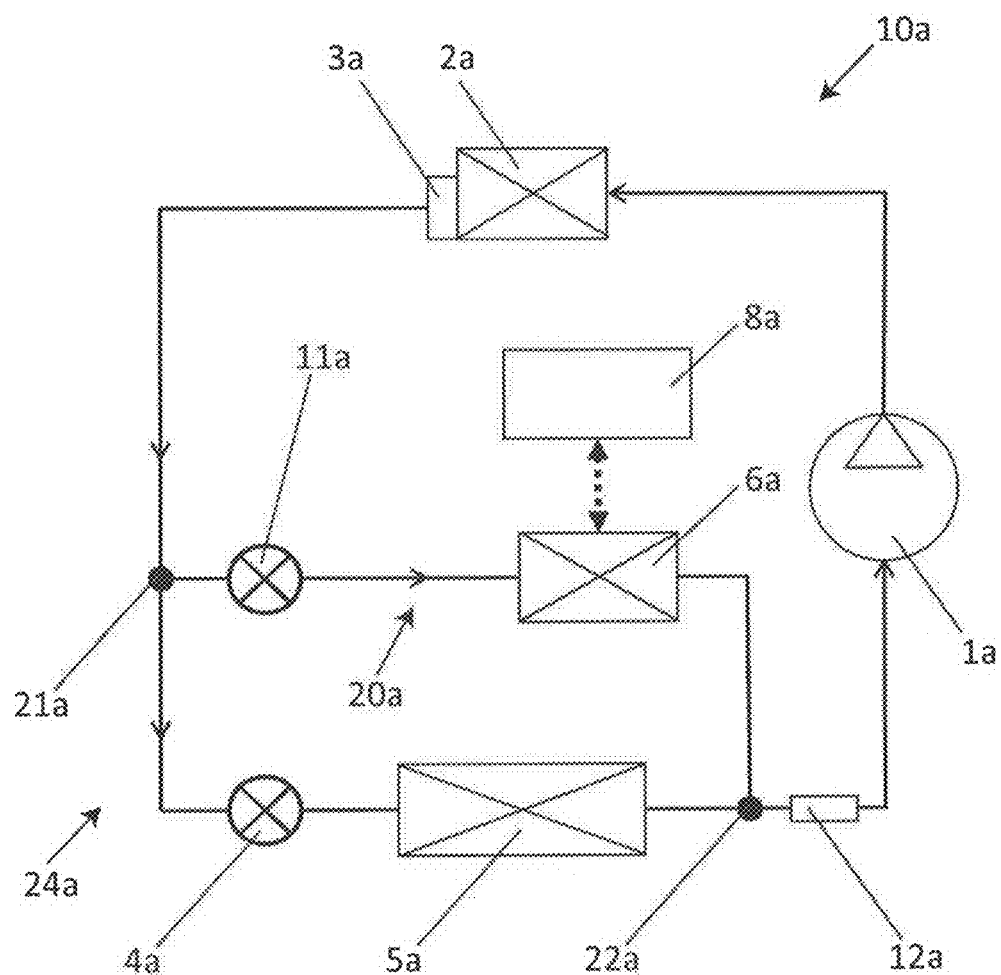
FIG. 1 shows, in an illustration in the form of a block diagram, a refrigerant cycle of a comparative example.

Refrigerant cycles as part of cooling/heating systems are used, for example, in motor vehicles with an electric drive (for example, with a fuel cell) or hybrid drive, in order to protect a battery functioning as an energy store against excessive heating. It is variously known, in this context, to cool the battery by means of a cooling circuit which functions at the same time as an air conditioning system for cooling supply air for a vehicle interior.

An exemplary heat exchanger block may include a first fluid channel for a coolant and a second fluid channel for a refrigerant, an expansion valve for controlling a mass flow rate of the refrigerant, a connection flange having an inlet channel and an outlet channel for the refrigerant, wherein the inlet channel is connected to the second fluid channel in an transition region. An electric expansion valve (EXV) may be used to control the mass flow rate of refrigerant Another exemplary climate-control system may include a refrigerant subsystem having a chiller and an EXV arranged to selectively route refrigerant to the chiller, paired with a coolant subsystem having conduit arranged to circulate coolant through a traction battery and the chiller. The coolant subsystem further includes a first temperature sensor configured to measure coolant circulating into an inlet side of the chiller and a second temperature sensor configured to measure coolant circulating out of an outlet side of the chiller. A vehicle controller may be configured to, in response to the battery exceeding a threshold temperature and cabin air conditioning being requested, command opening of the EXV to a predetermined position and adjust the position based on a measured coolant temperature difference between the first temperature sensor and the second temperature sensor.

Another exemplary cooling system may include a cooling circuit and a refrigerating circuit which are coupled to one another via a refrigerant/coolant heat exchanger. Located in the cooling circuit are a battery to be cooled and an air/coolant heat exchanger for cooling the coolant by means of ambient air. The air/coolant heat exchanger can be bypassed by the coolant in a controllable way via a bypass line. An evaporator for cooling vehicle interior supply air is located in a refrigerating circuit branch parallel to the branch of the refrigerant/coolant heat exchanger. In this cooling system, the cooling of the battery may take place, on the one hand, via the air/coolant heat exchanger by means of ambient air and, on the other hand, via the refrigerant/coolant heat exchanger by means of the refrigerating circuit. In the refrigerating circuit, a changeover valve is provided, which controls whether the refrigerant flows via the refrigerant/coolant heat exchanger or via the evaporator for cooling the supply air.

One concern regarding the above exemplary configurations is the high complexity and consequently the high cost of the refrigerant cycles. Moreover, the efficiency of the cooling of the heat source is subject to improvement, since the performance of the cooling may be improved. A further concern regarding the above exemplary configurations is the lack of flexibility to control the performance/heat transfer of a heat exchanger.

These concerns are more clearly illustrated by a comparative example shown in FIG. 1. Specifically, a comparative example refrigerant cycle 10a, in which a conventional refrigerant circulates, is shown in FIG. 1. The refrigerant cycle 10a comprises a compressor 1a for compressing the refrigerant in the cycle, wherein a stream of refrigerant in the cycle is provided. The compressed and heated refrigerant from the outlet of the compressor 1a is then cooled by a high pressure heat exchanger 2a, which in turn has a modulator receiver 3a at its outlet. Afterwards the refrigerant cycle 10a is divided into two parallel branches 20a, 24a at a first junction 21a. Hence, the refrigerant stream is separated into two refrigerant streams in each branch 20a, 24a, respectively. The first branch 24a comprises a first expansion device 4a, which could be an electric expansion device, and subsequently a first low pressure heat exchanger 5, for example an air evaporator for cooling air of a cabin of the motor vehicle. The second branch 20a comprises a second expansion device 11a, which could be an electric expansion device, and a second low pressure heat exchanger 6a. The second low pressure heat exchanger 6a, for example a cooler or chiller, can exchange heat with a heat source 8a, for example a battery of the vehicle by means of, for example, air cooling. The first branch 24a and the second branch 20a are connected at a second junction 22a. Hence, the two separate refrigerant streams of the first and second branches 24a, 20a are combined into on main refrigerant stream that flows to the inlet of the compressor is via a common evaporator pressure regulator 12a.

However, with this refrigerant cycle 10a, the outlets of the evaporator 5a and chiller 6a are directly connected for mixing the refrigerant at the junction 22a. Theoretically, if there is a minimum pressure drop in the pipes connecting the outlets of the evaporator 5a and the chiller 6a, the evaporator 5a and chiller 6a outlets provide the same pressure. Practically, the pressures at the outlets of the evaporator 5a and chiller 6a, respectively, are highly dependent to each other and almost identical to each other.

The mixing pressure at the junction 22a will be dependent on which of the heat exchangers 5a, 6a operates (evaporates) at a lower pressure. In most cases the resulting pressure or its equivalent saturation temperature is defined by cabin evaporator, since evaporation in a cooling mode of the refrigerant cycle 10a usually takes place below 10 degrees Celsius, while the chiller 6a should operate at a higher temperature, since a vehicle battery commonly requires about 25 degrees Celsius water temperature.

In this common case, an efficient performance distribution to the evaporator 5a and chiller 6a may be difficult, since they are both affected from one another. In other words, there is an inherent mutual dependency of the pressure drops of both heat exchangers 5a, 6a. Consequently, there is a strong concern that both heat exchangers 5a and 6a may not be able to work at their optimal efficiency at the same time. Additionally, changes in the load of the first heat exchanger 5 and the coolant flow rate in the first heat exchanger also inherently affect the flow in the second heat exchanger, which may negatively influence the performance of the second heat exchanger 6a.

Moreover, the use of two electrical expansion devices in this comparative example refrigerant cycle 10a results in a complex and expensive setup.

Figure 2:
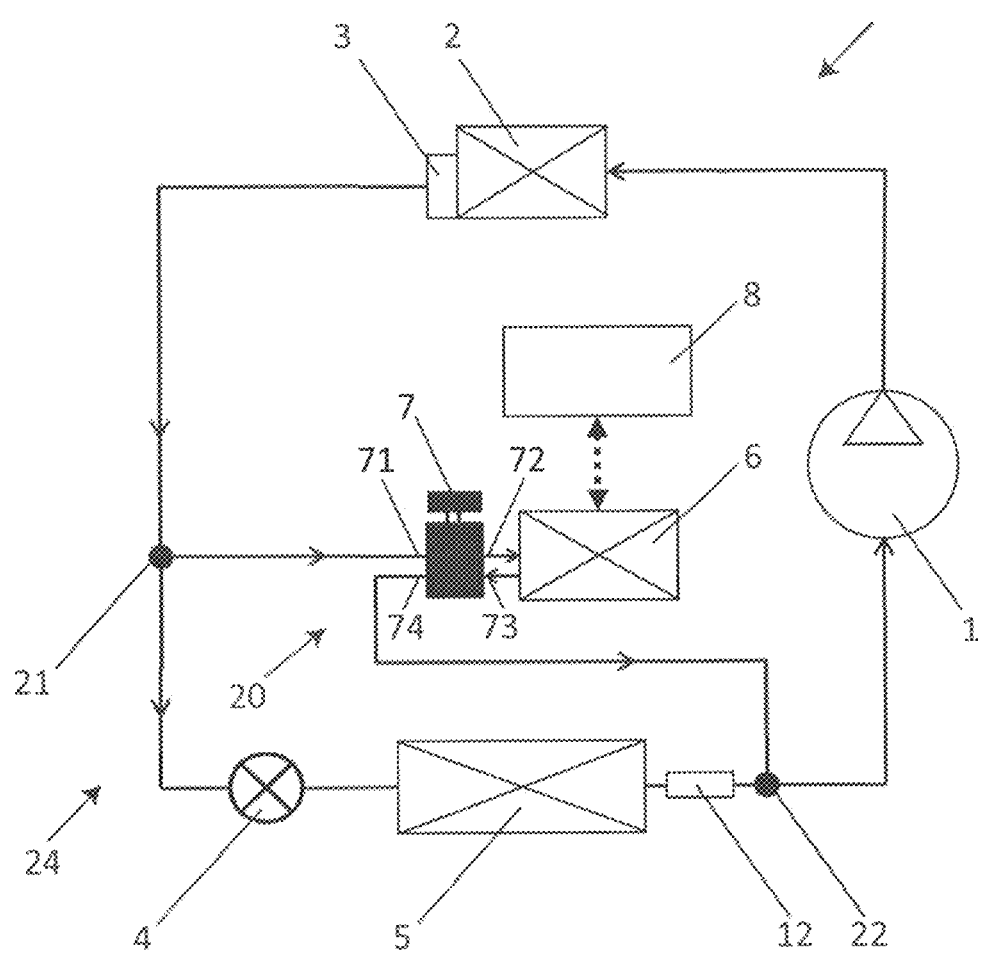
FIG. 2 shows, in an illustration in the form of a block diagram, a refrigerant cycle for a motor vehicle for cooling/heating, inter alia, a battery.

FIG. 2 shows a refrigerant cycle 10 for a motor vehicle for cooling/heating, inter alia, a battery according to a first aspect of the present disclosure. Similar to FIG. 1, a compressor 1 compresses the refrigerant, wherein a high pressure heat exchanger 2, for example an air condenser, removes heat from the compressed refrigerant. Alternatively, an indirect loop of a water condenser and a radiator could be uses instead of the air condenser.

The outlet of the high pressure heat exchanger 2 is connected to a modulator receiver 3. Alternatively, an accumulator at the inlet of the compressor 1 could be used.

The refrigerant cycle 10 splits into two parallel branches 24, 20 at the junction 21. The first branch 24 comprises a first electric expansion device 4 and subsequently a first low pressure heat exchanger 5, for example an air evaporator for cooling air of a cabin of the motor vehicle. Alternatively an indirect air cooling can be realized by using a chiller and a cooler core. Furthermore, the first branch 21 comprises its own evaporator pressure regulator 12 for regulating the pressure (drop) of the first low pressure heat exchanger 5

The second branch 20 comprises a dual expansion device 7 and a second low pressure heat exchanger 6, for example a cooler or chiller, which can exchange heat with a heat source 8, for example a battery, a motor generator or an inverter of the vehicle. In detail, the dual expansion device 7 has a first inlet 71, a first outlet 72, a second inlet 73 and a second outlet 74. The first inlet 71 is fluidly connected to the first junction 21. The first outlet 72 is fluidly connected to an inlet of the second low pressure heat exchanger 6a. The outlet of the second low pressure heat exchanger 6a is fluidly connected to the second inlet 73 of the dual expansion device 7. The second outlet 74 of the dual expansion device is fluidly connected to the second junction 22.

The heat exchange between the second heat exchanger 6 and the heat source 8 can be realized by air cooling or with a separate fluid cooling cycle (not shown) connecting both. Within this cooling cycle a conventional coolant, for example a water/glycol mixture, circulates from the heat source 8 to the second heat exchanger 6 and vice versa. This cooling cycle includes, as the heat source 8 to be cooled, the battery that, for example, may be a traction battery of a hybrid drive serving as a motor vehicle drive. The battery is consequently cooled or heated by the coolant, wherein a temperature sensor for measuring the coolant temperature, could additionally be provided in the cooling cycle downstream of the heat source 8. Moreover a coolant pump and a control valve could be provided in this cooling cycle. By means of this optional control valve, the coolant can be supplied in controllable fractions to the refrigerant/coolant heat exchanger 6.

Figure 3:
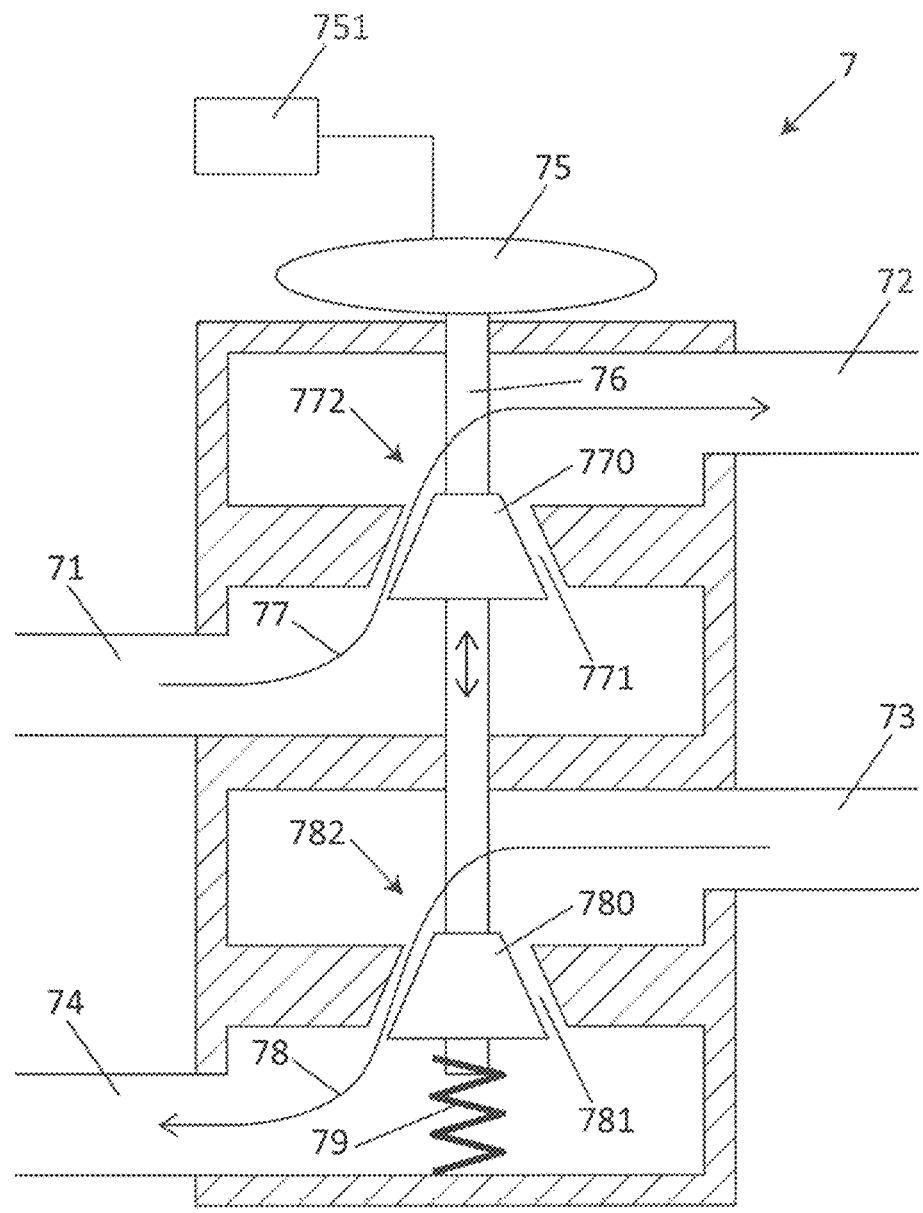
FIG. 3 shows a cross section of a dual expansion valve.

The dual expansion device 7 according to the present disclosure is explained in more detail with respect to FIG. 3. The first inlet 71 and the first outlet 72 are fluidly connected together, and thus a first passage for the refrigerant is provided. The first passage is also fluidly separated from the second inlet 73 and the second outlet 74. The refrigerant can flow from the first inlet 71 to the first outlet 72, and thus, a controllable first refrigerant steam 77 (i.e. the volumetric flow [l/min] and/or the mass flow [kg/min] of the refrigerant) can be provided. Between the first inlet 71 and the first outlet 72, a first flow restriction mechanism 772 is arranged that can controllably restrict the first refrigerant steam 77. In detail, the first flow restriction mechanism 772 is provided by a movable first valve element 770 that is arranged within a first orifice 771. The movable first valve element 770 is attached to a movable rod 76. The rod 76 can be moved along an axis, for example up and down as depicted by the double-arrow in FIG. 3 in order to change the available cross-section (e.g. in [mm$^2$]) for the flow of the first refrigerant steam 77. Consequently, a first expansion valve is provided.

The first and second refrigerant flow can have the same mass flow in steady state. Temporarily, the mass flow may deviate, e.g. when the chiller is working as refrigerant trap/releaser. The volume flows are typically different because of the different temperatures upstream/downstream of the chiller.

Moreover, as depicted in FIG. 3, are the second inlet 73 and the second outlet 74 fluidly connected together, and thus a second passage for the refrigerant is provided. The second passage is also fluidly separated from the first inlet 71 and the first outlet 72 and their corresponding passage for the refrigerant. The refrigerant can flow from the second inlet 73 to the second outlet 74, and thus, a controllable second refrigerant steam 78 (i.e. the volumetric flow [l/min] and/or the mass flow [kg/min] of the refrigerant) can be provided. Between the second inlet 73 and the second outlet 74, a second flow restriction mechanism 782 is arranged that can controllably restrict the second refrigerant steam 78. In detail, the second flow restriction mechanism 782 is provided by a movable second valve element 780 that is arranged within a second orifice 781. The movable second valve element 780 is also attached to the movable rod 76. By moving the rod 76, the available cross-section (e.g. in [mm²]) for the flow of the second refrigerant steam 78 can be changed. Consequently, also a second expansion valve is provided in the dual expansion valve.

Consequently, the first valve element 770 and the second valve element 780 are jointly moved and thus the first refrigerant steam 77 and the second refrigerant stream can be advantageously controlled by the movement of one single rod 76. Hence, the dual expansion valve according to the present disclosure has a simple construction, does not need electric actuators and thus can be manufactured at low cost.

The movable rod 76 is preferably attached a spring 79 on one side, and attached to an actuator 75 or valve driving member 75. The actuator is preferably a bulb 75, which is connected to a sensing element 751. The sensing element 751 can be used for sensing a temperature at a selected place of the refrigerant cycle. The bulb 75 is preferably filled with a gas or a liquid, and can expand and contract according to the sensed temperature. The sensing element 751 can also be filled with a gas or a liquid and can be fluidly connected with the bulb 75. If the bulb expands, the rod moves against the pressure of the spring 79 (in FIG. 3 the movement direction would be downwards) and the first and second expansion valves open by increasing the available cross-sections for the first refrigerant stream 77 and the second refrigerant stream 78. In other words, the gas or fluid pressure in the bulb 75 provides the force to open the dual expansion valve, therefore adjusting the flow of refrigerant and the consequently controlling the performance/heat transfer, especially the superheat.

Preferably, the movement of the rod 76 can be (essentially) linearly depended to the sensed temperature, and thus the flow coefficients of both expansion valves are (essentially) linearly dependent to the sensed temperature.

Moreover, the first flow restriction mechanism 772 and the second flow restriction mechanism 782 can be dimensioned such that the rates of change of the cross sections of the first and second restriction mechanisms due to the movement of the control member are different to each other. For example the sizes of the first and second orifices 771 and 772 can be different to each other, or the sizes of the first valve element 770 and the second valve element 780 can be different to each other. Hence, the dual expansion valve 7 can provide different linear flow characteristics for both of its expansion valves.

Moreover, both flow restriction mechanism 772 and 782 can be dimensioned such that the dual expansion valve is configured such that there is a monotonous dependency, particularly a linear or an essential linear dependency, of first refrigerant stream to the sensed temperature that there is a monotonous dependency, particularly a linear or an essential linear dependency, second refrigerant stream to the sensed temperature, and preferably the gradient of the monotonous or basically essentially linear dependency of first refrigerant stream to the sensed temperature is greater than the gradient of the monotonous or essentially linear dependency of second refrigerant stream to the sensed temperature.

The shape of the movable first valve element 770 can be cone-shaped or have a trapezoidal truncated conical form in its cross-section, as depicted in FIG. 3. Alternatively, it can be ball-shaped or spherical in its cross-shape. The same applies to the second valve element 780.

The dual expansion device 7 enables a control of the flow in the second low pressure heat exchanger 6 and creates different pressure level as compared to the first low pressure heat exchanger 5 by refrigerant expansion both at the inlet and outlet of the second low pressure heat exchanger 6. Hence, the dual expansion device 7 enables a control the performance/heat transfer (or superheat) in the heat exchanger 6 essentially independent to the rest of the refrigerant cycle 10 with an simple construction at low cost.

With the refrigerant cycle 10 and the dual expansion valve 7 according to the first aspect of the present disclosure, it is possible to provide a lower superheat for the second heat exchanger 6 as compared the prior art refrigerant cycle 10a. Thus, the refrigerant cycle 10 is more efficient.

The TXV setting is dependent on the target water temperature for battery cooling (e.g., chiller water in or out). It is comparable to the superheat setting in commonly used TXV for cabin evaporators.

Figure 4:
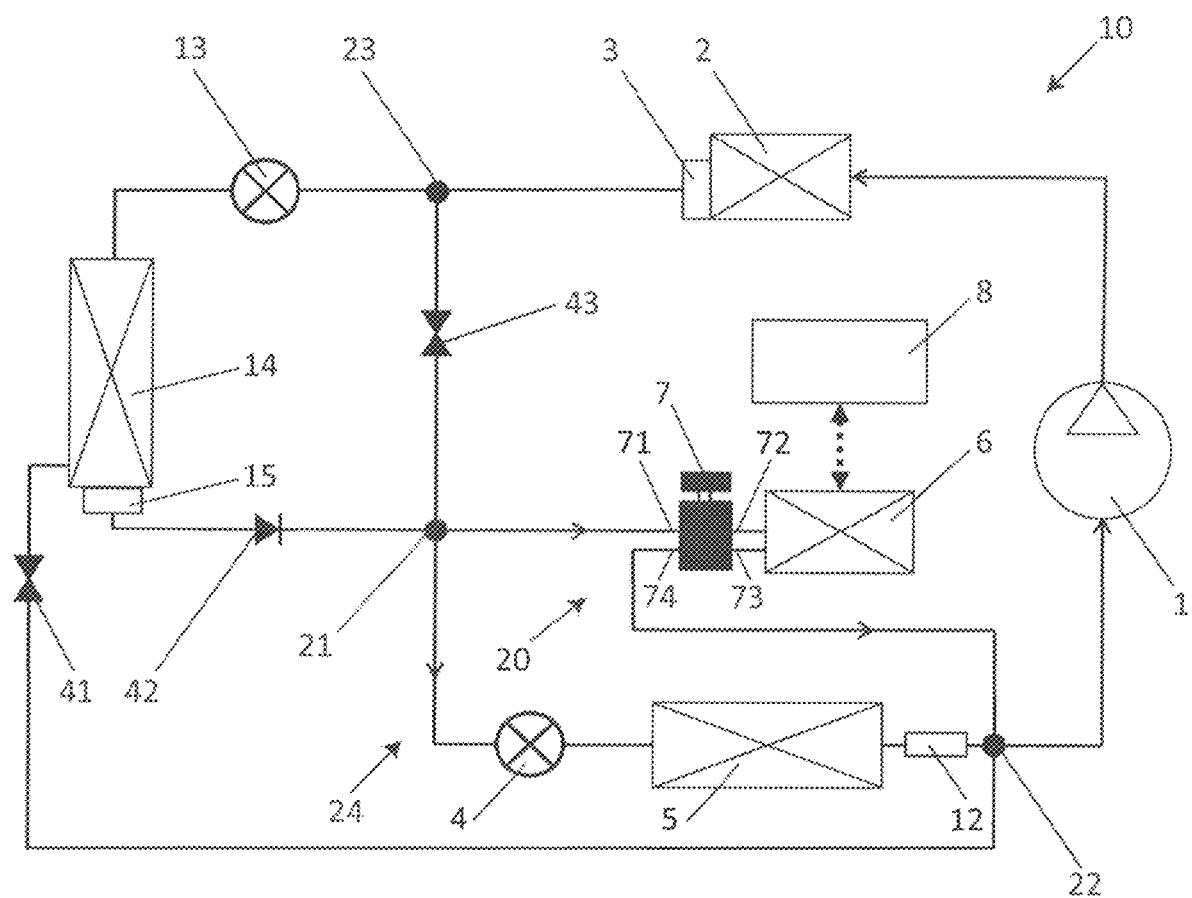
FIG. 4 shows, in an illustration in the form of a block diagram, a refrigerant cycle for a motor vehicle for cooling/heating, inter alia, a battery.

FIG. 4 shows a second aspect of the present disclosure. The same reference numerals of FIG. 4 refer to the same parts or functions as already explained in context with FIGS. 2 and 3, and hence a detailed explanation of these parts or functions can be omitted.

According to the second aspect of the present disclosure, a combined cooling and heating cycle is provided that is able to work as a heat pump. For example, it can be necessary to heat a battery 8 of a vehicle, e.g. in winter, up to an optimal working temperature of the battery 8. Hence, a heat source 8 according to the present disclosure is a device that needs either to be cooled down or to be heated up to a certain target temperature. In other words the heat source 8 can also be a heat sink 8.

FIG. 4 contains a third junction 23, in which the flow of the refrigerant stream is separated. A further expansion device 13 expands the refrigerant into a fourth heat exchanger 14 and a second modulator receiver 15. Two shut valves 43 and 41 are provided in order to switch the function of the refrigerant cycle 10 to cooling or heating. Further, a check valve 42 is provided in order to control the flow of the output of the modulator 15 to the junction 42.

Hence, the dual expansion device 7 is also applicable for a heat pump operation with waste heat usage via a chiller and ambient heat absorption via an outside heat exchanger 14 (as evaporator).

As apparent from the exemplary embodiments described above, including the variants outlined, the system provided by the present disclosure allows an optimal cooling or heating of a heat source, such as a battery, on the one hand by means of a refrigerating cycle preferably being carried out only when, and insofar as, this is unavoidable. On the other hand, cooling takes place, as far as possible, solely or proportionately, by means of the second heat exchanger 6.

Specifically, the dual expansion valve in various embodiments described herein for a refrigerant cycle of a vehicle makes it possible to provide an evaporation pressure/temperature of a first branch of the refrigerant cycle that is independent to the evaporation pressure/temperature evaporator a second branch of the refrigerant cycle. Hence, it is possible to control the performance/heat transfer in a certain heat exchanger independently. In detail, the dual expansion valve described above can control the refrigerant streams at the inlet and outlet of a heat exchanger at the same time. This heat exchanger can be controlled independently to the rest of the refrigerant cycle, since the dual expansion valve functionally separates the heat exchanger (i.e. the fluid stream from and to the heat exchanger) from the rest of the refrigerant cycle. Consequently, the heat exchanger, which is connected to the first outlet and the second inlet of the dual expansion valve can be controlled to work at its optimal physical conditions (for example evaporation temperature, target temperature, pressure drop, etc.).

Moreover, the integration of two flow restriction mechanisms, i.e. two expansion valves, into one device makes it more compact, easier to manufacture and more cost efficient.

Additionally, the use of thermal control of the dual expansion valve enables quick adjustments of the flow characteristics of the dual expansion valve and saves an extra control unit, which would be needed for an electrical expansion device as used conventionally.

Further advantages are exhibited when the dual expansion valve described herein is provided with the first and the second flow restriction mechanisms which are configured such that the respective rates of change of the cross sections of the first and second restriction mechanisms due to the movement of the control member are different to each other. In this case, the flow characteristics, e.g., the flow coefficients, of the two (expansion) valves, which are provided by the dual expansion valve, are different to each other. Hence, it is possible provide a dual expansion valve that can suitably control the flow of the refrigerant into the inlet of a heat exchanger and, at the same time, the flow of the out of the very same heat exchanger. The flow coefficient is a relative measure of the efficiency of the valve(s) at allowing the refrigerant flow. It describes the relationship between the pressure drop across the valve and the corresponding flow rate.

Further advantages are exhibited when the dual expansion valve described herein is configured such that there is a monotonous dependency, particularly a linear or an essential linear dependency, of first refrigerant stream to the sensed temperature; and the dual expansion valve is configured such that there is a monotonous dependency, particularly a linear or an essential linear dependency, of second refrigerant stream to the sensed temperature; and/or the gradient of the essentially linear dependency of first refrigerant stream to the sensed temperature is greater than the gradient of the essentially linear dependency of second refrigerant stream to the sensed temperature. A monotonous dependency of the first refrigerant stream (e.g. its mass flow rate or its volumetric flow rate) to the sensed temperature can be understood as a dependency of the first refrigerant stream (y) to the sensed temperature (x) in the sense of a monotonic function y=f (x), wherein this function is either entirely non-increasing or entirely non-decreasing. Examples of such a monotonic function are linear (increasing or decreasing) functions, quasi linear (increasing or decreasing) functions, logarithmic (increasing or decreasing) functions or parabolic (increasing or decreasing) functions.

In this case, optimal flow coefficients of the two (expansion) valves that enable an accurate and efficient control of the heat exchanger performance (and consequently the amount of exchanged heat) are both basically monotonous, especially almost linear. Additionally, these two optimal and linear flow coefficients have different gradients, which can be determined accurately, for example by calculations.

Further advantages are exhibited when the dual expansion valve described herein is provided such that the control member for jointly moving the first valve member and the second valve member is a single rod; and the movable first valve element and the movable second valve element are arranged to provide a variable cross section of the first passage and the second passage, respectively.

In this case, the dual expansion device according to the present disclosure is preferably a dual thermal (mechanical) expansion device (TXV), hence, it has no electrical actuation. This makes the construction less costly as compared to an electrical expansion device. Moreover, both valve members are actuated by the same rod. Hence, only one actuation mechanism is necessary. Consequently, the dual expansion device is compact, easy to manufacture and is less expensive.

Further advantages are exhibited when the dual expansion valve described herein is provided such that the valve further comprising a bias member, preferably an essentially linear spring, which biases the control member into a first direction; wherein the valve driving member, preferably a bulb, drives the control member into a second direction, opposite to the first direction. As explained above, optimal flow coefficients of the two valves are essentially linear. Thus, a linear mechanical spring is an easy and straight forward solution in order to bias the flow restriction mechanisms.

In other embodiments, the dual expansion valve described herein may be a mechanical expansion valve using thermal control of the first and second refrigerant stream. In addition, the dual expansion valve described herein provides heat may be configured to provide heat exchange for a refrigerant circuit and a coolant circuit, in which the first refrigerant stream enters upstream into the first heat exchanger and the second refrigerant stream exits downstream of the first heat exchanger, and in which the dual expansion valve is configured for thermal management of the heat source within the coolant circuit that is exchanging heat with the refrigerant circuit.

In other embodiments, the dual expansion valve described herein may be applied to a refrigerant cycle for a vehicle, wherein the refrigerant cycle comprises a compressor for compressing the refrigerant, and a second heat exchanger, preferably a radiator, that dissipates heat of the compressed refrigerant, wherein the second heat exchanger is fluidly connected to the compressor, and an expansion device that expands the compressed refrigerant, wherein the expansion device is fluidly connected to the second heat exchanger, and a third heat exchanger for exchanging heat with the expanded refrigerant, wherein the third heat exchanger is fluidly connected the expansion device and to the compressor, a junction separating the refrigerant stream upstream of the expansion device and the third heat exchanger, a first branch including the expansion device and the third heat exchanger and the second branch including the arrangement of the first heat exchanger and the dual expansion valve.

When the dual expansion valve is applied to the refrigerant cycle for a vehicle, the sensed temperature is either the temperature at the inlet or at the outlet of the first heat exchanger in the cooling circuit or the refrigerant circuit, and the dual expansion valve controls the first flow quantity of the first refrigerant stream and the second flow quantity of the second refrigerant stream in dependency to a target temperature for cooling the heat source/sink.

Further, when the dual expansion valve is applied to the refrigerant cycle for a vehicle, the bias member and the cross sections of the dual expansion valve are adapted such that the pressure level of the first heat exchanger is different, particularly higher, than the pressure level of the third heat exchanger.

The advantages of the above mentioned embodiments are as follows: No controller, cheaper, saves space, less number of components and less piping/block joints.

For the application of the dual expansion value described herein to battery cooling using water, a range of temperature is usually acceptable (e.g. just <35 degrees Celsius battery cell temperature is desired). Therefore a highly accurate control (e.g. +/−0.5 K) of the cooling water is not a priority. Hence, a mechanical dual expansion valve is sufficient in order to control the performance/heat transfer of a heat exchanger.

The means of controlling the refrigerant stream in the refrigerant cycle 10 according to the present disclosure may contain a multiplicity of other components, such as further and other control and shut-off valves and also pumps. The presence and arrangement of the components in the refrigerant circuit may be changed within wide limits in the concept of the present disclosure, particularly with regard to the position of the compressor, of the heat exchangers and of the temperature sensor.

The present disclosure is not limited to the above-described aspects. The present disclosure includes various modifications and changes within a scope of the present embodiment. In the above-described embodiments, it is to be understood that elements constituting the embodiments are not necessary except for a case of being explicitly specified to be necessary and a case of being considered to be absolutely necessary in principle. Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

The invention claimed is:

1. A refrigerant cycle for a vehicle, comprising:
    a first heat exchanger arranged to provide heat exchange between a refrigerant circuit and a coolant circuit;
    a compressor for compressing the refrigerant;
    a second heat exchanger that dissipates heat of the compressed refrigerant, wherein the second heat exchanger is fluidly connected to the compressor;
    an expansion device that expands the compressed refrigerant, wherein the expansion device is fluidly connected to the second heat exchanger;
    a third heat exchanger for exchanging heat with the expanded refrigerant, wherein the third heat exchanger is fluidly connected to the expansion device and to the compressor;
    a dual expansion valve including
        a first inlet and a first outlet,
        a first flow restriction mechanism including a movable first valve element, by which a first refrigerant stream flowing through a first passage from the first inlet to the first outlet can be controlled,
        a second inlet and a second outlet,
        a second flow restriction mechanism including a movable second valve element, by which a second refrigerant stream flowing through a second passage from the second inlet to the second outlet can be controlled,
        a rod for jointly moving the first valve element and the second valve element,
        a sensing element for sensing a temperature, and
        an actuator that is configured to drive the rod according to the sensed temperature, and
    a junction separating the refrigerant stream upstream of the expansion device and the third heat exchanger, a first branch including the expansion device and the third heat exchanger and a second branch, wherein
    the refrigerant circuit is configured such that the first refrigerant stream enters upstream into the first heat exchanger and the second refrigerant stream exits downstream of the first heat exchanger,
    the coolant circuit is configured such that the coolant circulates a traction battery of a hybrid drive serving as a motor for driving the vehicle and the first heat exchanger, and
    the dual expansion valve is configured for thermal management of that traction battery within the coolant circuit that is exchanging heat with the refrigerant circuit.

2. The refrigerant cycle according to claim 1, wherein the first and the second flow restriction mechanisms are configured such that the respective rates of change of the cross sections of the first and second restriction mechanisms due to the movement of the rod are different from each other.

3. The refrigerant cycle according to claim 1, wherein the dual expansion valve is configured such that there is a monotonous dependency of the first refrigerant stream to the sensed temperature,
the dual expansion valve is configured such that there is a monotonous dependency of the second refrigerant stream to the sensed temperature, and
a gradient of the monotonous dependency of the first refrigerant stream to the sensed temperature is greater than a gradient of the monotonous dependency of the second refrigerant stream to the sensed temperature.

4. The refrigerant cycle according to claim 1, wherein the movable first valve element and the movable second valve element are arranged to provide a variable cross section of the first passage and the second passage, respectively.

5. The refrigerant cycle according to claim 1, wherein the dual expansion valve further includes a bias member which biases the rod into a first direction, and
the actuator drives the rod into a second direction, opposite to the first direction.

6. The refrigerant cycle according to claim 1, wherein the dual expansion valve is a mechanical expansion valve configured to thermally control of the first and second refrigerant stream.

7. The refrigerant cycle according to claim 1, wherein the sensed temperature is either the temperature at the inlet or at the outlet of the first heat exchanger in the cooling circuit or the refrigerant circuit; and
the dual expansion valve controls the first flow quantity of the first refrigerant stream and the second flow quantity of the second refrigerant stream in dependency to a target temperature for cooling the traction battery.

8. The refrigerant cycle according to claim 1, wherein a bias member and the cross sections of the dual expansion valve are adapted such that the pressure a pressure level of the first heat exchanger is different than a pressure level of the third heat exchanger.

9. The refrigerant cycle according to claim 1, wherein the rod is attached to a biasing member at a first end and the actuator at a second end opposite the first end, and the first valve element and the second valve element are disposed therebetween.

10. The refrigerant cycle according to claim 1, wherein the first valve element and the second valve element have a trapezoidal truncated conical shape in cross section.

11. The refrigerant cycle according to claim 1, wherein the first valve element and the second valve element move simultaneously in unison.

12. The refrigerant cycle according to claim 1, wherein a positive gradient is defined by a downward movement of the first valve element and the second valve element, and a negative gradient is defined by an upward movement of the first valve element and the second valve element.

13. The refrigerant cycle according to claim 1, wherein a cross sectional area defined between the first inlet and the first outlet, and a cross sectional area defined between the second inlet and the second outlet are similar throughout an entire range of movement of the first valve element and the second valve element.

14. The refrigerant cycle according to claim 1, wherein the first valve element closes the first inlet and the first outlet, and the second valve element closes the second inlet and the second outlet during movement of the first valve element and the second valve element in an upward direction.

15. The refrigerant cycle according to claim 1, wherein the first valve element opens the first inlet and the first outlet, and the second valve element opens the second inlet and the second outlet during movement of the first valve element and the second valve element in a downward direction.

* * * * *